United States Patent [19]
Murayama et al.

[11] Patent Number: 5,679,473
[45] Date of Patent: Oct. 21, 1997

[54] MAGNETIC RECORDING MEDIUM AND METHOD FOR ITS PRODUCTION

[75] Inventors: Akihiro Murayama; Masao Miyamura, both of Yonezawa; Shinji Kondoh, Yokohama, all of Japan

[73] Assignee: Asahi Komag Co., Ltd., Tokyo, Japan

[21] Appl. No.: 408,070

[22] Filed: Mar. 22, 1995

Related U.S. Application Data

[63] Continuation-in-part of Ser. No. 40,200, Apr. 1, 1993, Pat. No. 5,478,661.

[30] Foreign Application Priority Data

Mar. 22, 1994 [JP] Japan .................. 6-050819

[51] Int. Cl.$^6$ .................................................. G11B 5/66
[52] U.S. Cl. .................. 428/694 T; 428/694 TK; 428/694 B; 428/694 BA; 428/694 BH; 428/900
[58] Field of Search ............... 428/694 T, 694 TR, 428/694 B, 694 BA, 694 BH, 900

[56] References Cited

U.S. PATENT DOCUMENTS

| | | | |
|---|---|---|---|
| 4,786,564 | 11/1988 | Chen et al. | 428/694 TS |
| 5,068,152 | 11/1991 | Maro et al. | 428/408 |
| 5,077,131 | 12/1991 | Nakano et al. | 428/423.9 |
| 5,112,669 | 5/1992 | Yoden et al. | 428/141 |
| 5,466,539 | 11/1995 | Takayama et al. | 428/611 |
| 5,480,694 | 1/1996 | Daimon et al. | 428/64.1 |

FOREIGN PATENT DOCUMENTS

| | | |
|---|---|---|
| 1185817 | 7/1989 | Japan . |
| 6282841 | 10/1994 | Japan . |

OTHER PUBLICATIONS

Zhu and Bertram, "Micromagnetic Studies of Thin Metallic Films" J. Appl. Phys. 63, 15 Apr. 1988, p. 3248.

*Primary Examiner*—Leszek Kiliman
*Attorney, Agent, or Firm*—Oblon, Spivak, McClelland, Maier & Neustadt, P.C.

[57] ABSTRACT

A magnetic recording medium having a magnetic thin film, wherein crystal grains constituting the magnetic thin film are separated by a crystal boundary region containing a non-ferromagnetic and non-metallic phase. The magnetic recording medium of the present invention provides a high coercivity and a remarkably reduced media noise property, and a high productivity in the mass production thereof.

4 Claims, 6 Drawing Sheets

MAGNETIC RECORDING MEDIUM AND METHOD FOR ITS PRODUCTION

This application is a continuation in part of U.S. patent application Ser. No. 08/040,200 filed on Apr. 1, 1993, now U.S. Pat. No. 5,478,661, and incorporated entirely herein by reference.

BACKGROUND OF THE INVENTION

1. Field of the Invention

The present invention relates to a magnetic recording medium and a method for producing it.

2. Discussion of Background

For hard magnetic disks used as high capacity recording media for computers or the like, demands for improvement of the recording density have been increasing year by year. To accomplish the strictly desired high recording density, it is very important to reduce media noises and to secure high coercivity of longitudinal magnetic thin films as recording media.

Coercivities of magnetic films which are presently commonly used, are at a level of from 1,200 to 1,600 Oe. Here, the reason for the presence of the upper limit of the coercivity is that there is a limit in the magnetic field to be formed by the writing head to be used. Recently, however, it has been made possible to fly the head at a lower height, and accordingly, it has been made possible to apply a higher magnetic field intensity to the magnetic thin film even with the head having the same magnetic field intensity. Further, by an improvement of the magnetic film material used for the head itself or by the precision processing of the coil portion due to the progress in fine processing, it has been expected to further increase the magnetic field created by the head in the future.

Accordingly, by a combination of such a technology of the head and the low flying height of the head, it should be possible to prepare a magnetic recording medium with a higher recording density by increasing the coercivity to a level of at least 1,800 Oe while maintaining the coercive squareness of the magnetic thin film at a level of at least 0.7.

The magnetic thin film materials to satisfy such demands for high coercivities, include a CoPt-based alloy such as CoNiPt, CoNiCrPt or CoCrPt and CoCr-based alloy such as CoNiCr or CoCrTa which is used in combination with a Cr underlayer. Their coercivities usually have an upper limit at a level of 1,800 Oe at a remanence of $3.5 \times 10^{-3}$ emu/cm$^2$ which is usually required for magnetic recording media. With CoPt-based magnetic thin films among them, it is known that a high coercivity can be accomplished by increasing the Pt concentration to a level of from 20 to 25 atomic %, as disclosed in IEEE Trans. Magn. MAG-19 (1983) 1514, J. Appl. Phys. 54 (1983) 7089, or IEEE Trans. Magn. MAG-19 (1983) 1638. However, such a method is not particularly useful, since it involves a substantial increase of costs. Further, incorporation of such a large amount of Pt element tends to lead to a substantial decrease in the remanence, such being undesirable from the viewpoint of the reproduction of a recorded information.

Accordingly, it is meaningful for a practical industrial application to accomplish the high coercivity with a lower Pt concentration at a level of about 10 atomic % which is feasible from the viewpoint of costs.

It has been reported that a high coercivity at a level of at least 2,000 Oe has been accomplished by forming a CoCrPtB film having B incorporated on a Cr underlayer (14th Meeting of The Magnetic Society of Japan, 8p B-18 (1990)). However, the production process requires a substrate temperature as high as 280° C. and a substrate bias of −300 V and thus has substantial problems yet to be solved for mass production.

Further, to accomplish high density magnetic recording, it is very important for a magnetic recording medium that the noise attributable to the medium during the reproduction of a recorded information is low. The media noise of thin film media are usually mainly caused by the irregularities of the domain structure in the magnetic transition boundary regions i.e. by the formation of so-called zigzag domains, which is largely influenced by the crystal grain structure of the magnetic thin film.

It has been theoretically proposed, particularly in the structure of fine crystal grains having a grain size of a most a few hundreds Å which constitute a magnetic film, that it is very effective to suppress the media noise due to the exchange interaction between the crystal grains, which is a very strong magnetic interaction at a small distance of a few atoms, by magnetically separating the ferromagnetic crystal grains. (J. Appl. Phys., 63, 3248 (1988)).

Accordingly, to reduce the media noise, it is necessary to modify and control the crystal grain structure of the magnetic thin film. Thus, it is necessary to study the alloy composition of the magnetic film and to control the sputtering process. It is known that the media noise can be reduced by using a NiP sputtering underlayer for a magnetic film of CoPt-based alloy (U.S. Pat. No. 4,786,564). In this proposal, the crystal grain structure of the NiP underlayer is effectively used to control the crystal grain structure of the magnetic film.

Further, it has been proposed that a CoNiCrPt magnetic film having Cr incorporated into a CoNiPt magnetic film, is used to obtain a further reduced media-noise property without deterioration of over-write property or high-frequency property such as the width of half-maximum of isolated pulse (U.S. Pat. No. 5,180,640).

However, for future high density magnetic recording, a so-called MR head using magneto-resistance effect is very effective and is believed to be inevitably practically used instead of an inductive type head such as a thin-film head and an MIG head which is presently used. As an important property of the MR head, it should be mentioned that the noise attributable to the head itself is remarkably low as compared with usual inductive type heads. Thus, the excellent high density recording characteristics of the magnetic medium with MR head is not valid, unless a so-called media noise attributable to the magnetic film is further reduced relative to the usual magnetic films.

Accordingly, the above-mentioned methods can not provide sufficient noise properties which will be required for future magnetic films, and it is necessary to realize further reduced media noise by investigating the component and the content for the magnetic film and improving the production process with the CoNiCrPt-based magnetic film having the NiP sputtering film as an underlayer.

As mentioned above, with the CoNiPt- or CoNiCrPt-based magnetic film having the NiP sputtering film as an underlayer, if the above-mentioned high coercivity and improvement of media noise are accomplished, it will be expected to accomplish the magnetic recording of further high density including the magnetic recording of the next generation using the MR head.

As a theoretical guideline for the high coercivity and the reduction of media noise, it is desired to magnetically separate respective crystal grains constituting the magnetic film as mentioned above, and to make the crystal grain size small.

As a method for promoting the magnetic separation of crystal grains, a method is firstly conceivable wherein the growth of crystal grains is controlled by use of an underlayer to spatially separate the grains. However, as mentioned above, presently well known and effective underlayer such as a NiP underlayer or a Cr underlayer, provides weak and insufficient effects for the separation of crystal grains of the magnetic film.

Then, for a CoCr-based magnetic film, a method of forming a so-called phase-segregation structure is known wherein a sufficient substrate temperature is effected or a sufficient bias voltage is applied to a substrate to form regions having different proportions of Co and Cr in the crystal grains. (Jpn. J. Appl. Phys., 25, L668 (1986), IEEE Trans. Magn., MAG-24, 3012 (1988), Jpn. J. Appl. Phys., 29, 1705 (1990))

However, from the data obtained by the method mentioned above, the formed phase-segregated structure is present in a remarkably irregular form in large crystal grains, and large unseparated regions of about 1,000 Å are partially observed, whereby it is considered to cause problems in the future high density recording. Further, to form an effective phase-segregation structure of Co and Cr, it is inevitable to set sputtering conditions which will cause problems in an industrial scale such as heating of a substrate at a high temperature of close to 300° C. or application of a bias voltage to a substrate, whereby a big problem will be brought about in the mass production.

Further, according to the present inventors' studies, with such a CoCr-based alloy film containing Cr at a level of 20 atomic %, the saturation magnetization is remarkably reduced, whereby the magnetic film thickness necessary for obtaining sufficient magnetic recording signal intensity will increase. Such increase of the magnetic film thickness will cause deterioration of the width of half-maximum of isolated pulse or deterioration of the high-frequency property during the reproduction of a recorded information, such being inadequate for the high density recording.

Accordingly, in a process for producing a magnetic film having an alloy composition with less reduction of saturation magnetization, which has a sufficient productivity, if the crystal grains constituting the magnetic film are sufficiently fine and if it is possible to provide an effective magnetic separated structure between crystal grains by any method, it will be possible to obtain a high coercivity and a sufficiently low media noise which are necessary for future high density magnetic recording.

SUMMARY OF THE INVENTION

It is an object of the present invention to solve the above-mentioned problems and to provide anew a magnetic film having an alloy composition with a less reduction of saturation magnetization and a high productivity in the process for preparation thereof, to obtain a high coercivity and a sufficiently low media noise property to meet particularly a so-called MR head using magneto-resistance effect which are necessary for future high density magnetic recording, and a magnetic recording medium using the magnetic film.

The present invention has been made to solve the above-mentioned problems and to provide a magnetic recording medium comprising a magnetic thin film, wherein crystal grains constituting the magnetic thin film are substantially separated by a grain-boundary region containing a non-ferromagnetic and non-metallic phase.

Particularly, it is preferred that the grain size of the crystal grains is from 10 to 500 Å and the separation width between the crystal grains is substantially from 2 to 50 Å, and further preferred is that the separation width between the crystal grains is substantially from 10 to 50 Å.

BRIEF DESCRIPTION OF THE DRAWINGS

FIG. 2($b$) is a spectrum of a transmission-electron energy-dispersive spectroscopy at the point 5 in FIG. 1.

FIG. 5($b$) is a spectrum of a transmission-electron energy-dispersive spectroscopy at the point 4 in FIG. 4.

DETAILED DESCRIPTION OF THE PREFERRED EMBODIMENTS

Figure 1:
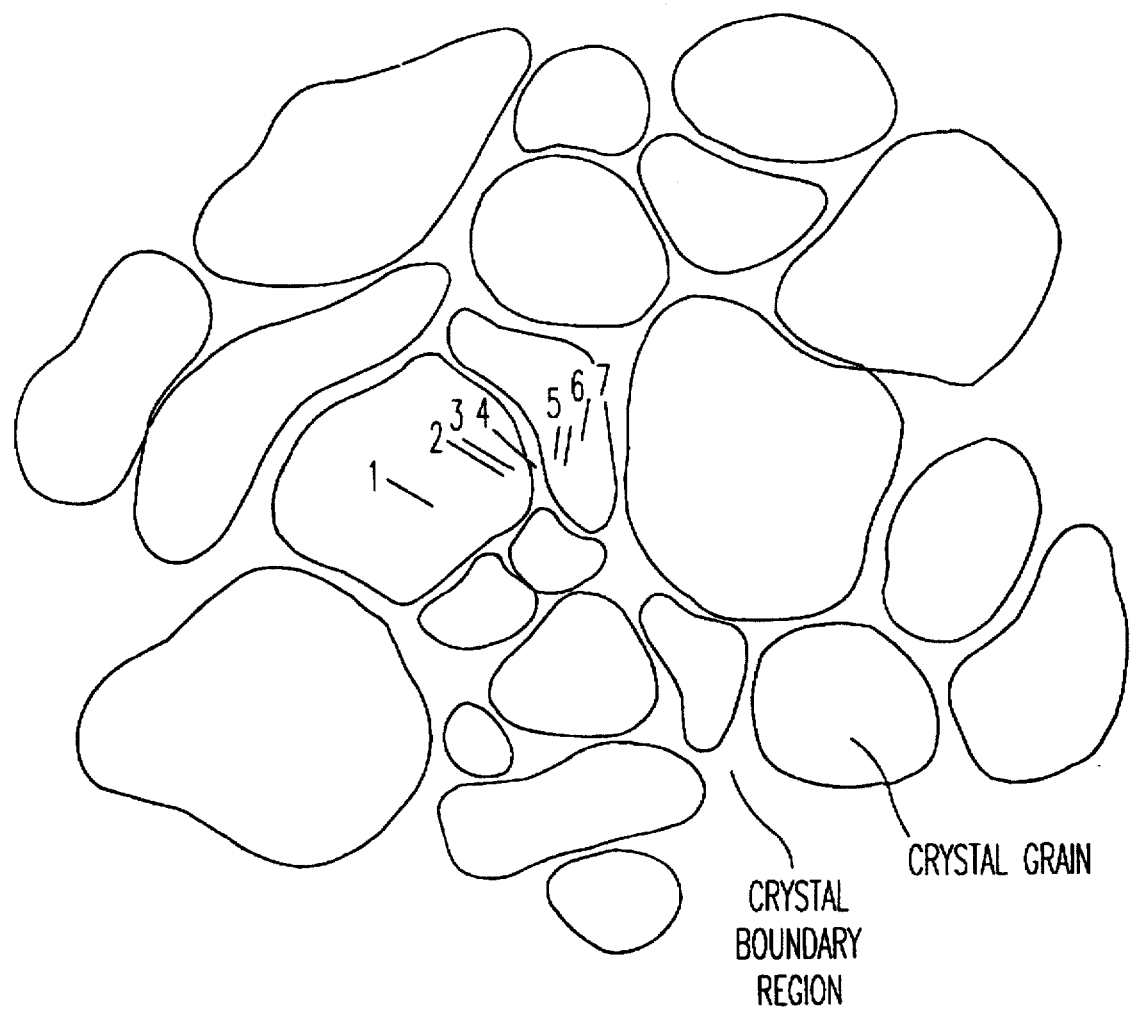
FIG. 1 is a diagrammatic view of a crystal grain structure of a $CoNiPt(SiO_2)_4$ magnetic film observed by a transmission-electron microscope. The numerals 1 to 7 in the figure are points where element analysis is conducted.

Here, the magnetic film used in the present invention is a Co-based alloy film and is a so-called polycrystalline film which is microscopically an aggregate of crystal grains. The crystal grain structure of a magnetic film can be observed by use of a transmission-electron microscope using an electron beam which transmit vertically against the film surface. The crystal grain size is defined to be a maximum diameter of each crystal grain in the longitudinal direction. The separation width between grains is the distance between respective crystal grains which is the narrowest and which is not 0.

It is impossible to avoid that crystal grains remarkably locally contact to one another by unavoidable uncontrollability in the production of the magnetic film. However, such a contact is negligible so far as the object of the present invention is not hindered.

In the present invention, crystal grains are substantially separated from one another except for such a remarkably local contact.

Further, the present invention provides a magnetic recording medium comprising a magnetic thin film, wherein the magnetic thin film is represented by $Co_{100-a-b-c-d}Ni_aCr_bPt_cM_d$, the size of the crystal grains is from 10 to 500 Å, and the crystal grains are separated by a non-ferromagnetic and non-metallic phase at a distance between the crystal grains within a range of from 2 to 50 Å. Here, M is a non-ferromagnetic and non-metallic element or compound. The proportion of respective components are represented by atomic percent, and satisfies $0 \leq a \leq 15$, $0 \leq b \leq 15$, $0 < c \leq 20$ and $0 < d \leq 20$, and a and b are not 0 at the same time.

In the present invention, as the non-ferromagnetic and non-metallic phase, a non-metallic phase comprising an oxide may be selected. Further, as the oxide, at least one of $SiO_2$, $Al_2O_3$, $TiO_2$, $ZrO_2$ and $Y_2O_3$ may be selected.

Further, the present invention provides a method for producing a magnetic recording medium, which comprises forming a magnetic thin film by a sputtering process using a target preliminarily containing a non-ferromagnetic and non-metallic component of an oxide and using RF plasma to form a segregated structure of a non-ferromagnetic and non-metallic phase between crystal grains constituting the magnetic thin film.

In the method of the present invention, the magnetic thin film is formed by a sputtering process using an Ar gas containing from 0.1 to 10 vol % of a nitrogen gas.

As mentioned above, for future high density magnetic recording, there have been particularly demanded that the magnetic film is made of an alloy with less reduction of saturation magnetization and the process for preparing it has a high mass productivity, and that the formed magnetic film has a fine crystal grain structure and also an effective magnetic separation structure between crystal grains by any method, whereby a high coercivity and a sufficiently reduced media noise are realized.

In the method of the present invention, as a means for accomplishing this purpose, it is proposed to form a magnetic film having a composition of $Co_{100-a-b-c-d}Ni_aCr_bPt_cM_d$ wherein M is a non-ferromagnetic and non-metallic compound such as an oxide, a, b, c and d are atomic % satisfying $0 \leq a \leq 15$, $0 \leq b \leq 15$, $0 < c \leq 20$ and $0 < d \leq 20$, and a and b are not 0 at the same time. Here, the target used for the sputtering method in the formation of the magnetic film, along with Co, Ni, Cr and Pt, contains a non-ferromagnetic and non-metallic component such as an oxide, and preferably a RF plasma is used during the sputtering, thereby realizing a magnetic film structure wherein crystal grains constituting the magnetic thin film have a grain size of from 10 to 500 Å and the crystal grains are separated by the non-ferromagnetic and non-metallic phase with the separation width between the crystal grains of substantially from 2 to 50 Å.

As mentioned above, to meet the demands for the high density recording including the use of a MR head, it is inevitable to realize further higher coercivity and remarkably improved media noise. To accomplish such coercivity and media noise, the present inventors have studied on the control of the crystal grain structure of the magnetic film by an underlayer or sputtering conditions. However, the desired properties have never been obtained.

Then, they have tried to incorporate various additives into a CoPt-based magnetic film itself, and as a result, they have succeeded to realize a structure wherein crystal grains constituting a magnetic film have a grain size of from 10 to 500 Å and the crystal grains are separated by a non-ferromagnetic and non-metallic phase with a separation width between the crystal grains of 2 to 50 Å by containing a non-ferromagnetic and non-metallic component such as an oxide in a target used for the formation of the magnetic thin film by a sputtering process, and preferably further a RF plasma is used during the sputtering, to incorporate the non-ferromagnetic and non-metallic component such as an oxide into the formed magnetic thin film. Further, they have found that the magnetic film having the crystal grain structure thus formed has a sufficiently high coercivity and remarkably improved media noise which are aimed in the present invention.

Here, if the grain size of the crystal grains constituting the magnetic film is less than 10 Å, the magnetic film tends not to exhibit ferromagnetism and to become superparamagnetic, whereby the coercivity and remanent magnetization which are required for magnetic recording will be substantially reduced, such being inadequate. Further, if the grain size exceeds 500 Å, the size becomes the same level as magnetization-transition region between recording bits, whereby the media noise will increase, such being inadequate. Further, if the separation width between the crystal grains is less than 2 Å, the exchange interaction is not adequately shut out to a level of sufficiently reducing the media noise, whereby the media noise is not sufficiently improved. The separation width is particularly preferably not less than 10 Å. Further, if the separation width between the crystal grains exceeds 50 Å, the packing density of the crystal grain in the magnetic film tends to be substantially lowered, whereby the magnetic film thickness necessary for obtaining sufficient magnetic recording signal intensity will be increased as mentioned above. Such increase of the magnetic film thickness tends to cause the deterioration of high-frequency property and width of half-maximum of isolated pulse during the reproduction of a recorded information, such being inadequate for the high density recording. Further, if the content of non-ferromagnetic and non-metallic component incorporated into the magnetic film (If the non-ferromagnetic and non-metallic component is a compound, the content is represented by percentage of the compound in the entire magnetic thin film in the present invention.) exceeds 20 atomic %, the saturation magnetization tends to be remarkably reduced, such being inadequate.

The present inventors have analyzed the crystal grain structure of the magnetic film formed by such a method, by use of a high-resolution transmission-electron microscope having a resolution ability of atomic order or an energy-dispersive spectroscope with a spatial resolution ability of 10 Å using a high-resolution transmission-electron beam, and have actually confirmed the presence of the phase-segregation structure having the non-ferromagnetic and non-metallic component as mentioned above between the crystal grains.

The present inventors have confirmed the presence of the non-ferromagnetic and non-metallic component which serves to shut out the exchange interaction between the crystal grains.

Further, the present inventors have found that it is possible to readily control, by the amount of the oxide to be preliminarily incorporated into the target, the extent of separation between the crystal grains, i.e. the separation width, which has a close relation to the coercivity and media noise which substantially influence the magnetic properties, particularly magnetic recording properties of the magnetic film. Namely, it can be said that the method for controlling the crystal grain structure described in the present invention has a high productivity and is capable of improving the magnetic properties and the recording density property of the magnetic film, and further remarkably useful to control the magnetic properties which have been problematic in the mass production of magnetic disks.

By the above-mentioned method, it has become possible to obtain a magnetic film having an alloy composition with a less reduction of saturation magnetization and a high productivity in the process for preparation thereof, to obtain a high coercivity and a sufficiently low media noise property to meet not only an inductive head, but also a MR head which are necessary for future high density magnetic recording, and a magnetic recording medium using the magnetic film.

Now, the present invention will be described in further detail with reference to Examples. However, it should be understood that the present invention is by no means restricted by such specific Examples.

EXAMPLE 1

An aluminum disk substrate having a NiP plating layer formed on the surface in a thickness of 15 μm, followed by texturing treatment was prepared. A magnetic recording medium having NiP/CoNiPtSiO/carbon films sequentially laminated on the aluminum disk substrate was formed by sputtering using RF plasma. For the formation of the magnetic film, a hot-press target containing 98% of Co(81)Ni(7)Pt(12) alloy and 2% of $SiO_2$, or a hot-press target containing 96% of Co(81)Ni(7)Pt(12) alloy and 4% of $SiO_2$, was used.

The thickness of the sputtered NiP underlayer (hereinafter referred to as a NiP underlayer) film was 420 Å, and the thickness of the magnetic film was controlled so that the remanence thickness product (Mrt) would be constant. During the sputtering, the sputtering pressure was 20 mTorr and an Ar gas containing 0.1 vol % of nitrogen gas was used. No intentional heating of the substrate or no application of a bias voltage to the substrate was conducted during the sputtering. The magnetic properties and magnetic recording properties of thus obtained magnetic recording media, measured by a vibrating sample magnetometer, are shown in Table 1 along with those of the case where a Co(81)Ni(7)Pt(12) alloy target to which no $SiO_2$ was incorporated, was used as comparative data.

In the table, the separation width between crystal grains obtained from the crystal grain structure observed by a transmission-electron microscope is also indicated. As a sample for the observation, the magnetic recording medium was laminated by mechanical polishing and ion-thinning method for use.

The magnetic recording properties were measured by writing and reproducing by use of a thin-film head with a flying height of 0.1 μm. The electric current for writing was 27 mA. The frequency for the writing signals was 5 MHz. The thickness of the magnetic film was controlled so that Mrt of the samples to be measured would be substantially the same.

As apparent from the results, no substantial separation between the crystal grains was formed when no $SiO_2$ was added (the separation width was 0), a segregated structure was formed between the crystal grains by an addition of $SiO_2$, wherein as the added amount of $SiO_2$ increased, the separation width increased and at the same time the coercivity on the magnetic hysteresis of the magnetic film remarkably increased. Although the coercive squareness slightly decreased, it was not problematic in a practical use. For the magnetic recording properties, the media noise was found to be remarkably improved by the addition of $SiO_2$. It has been formed by a X-ray Photoemission Spectroscopy (XPS) analysis that when $SiO_2$ is added, Si incorporated in the magnetic film is contained in a $SiO_2$ form. Namely, the incorporated $SiO_2$ is present as such in the magnetic film.

Further, the crystal grain structure of the magnetic film formed by the above method, was actually analyzed by use of an energy-dispersive spectroscopy with a spatial resolution of 10 Å using a high-resolution transmission-electron beam. Firstly, the crystal grain structure of the $Co_{79}Ni_6Pt_{11}(SiO_2)_4$ (hereinafter referred to as CoNiPt(SiO$_2$)$_4$) magnetic film observed by a transmission-electron microscope is diagrammatically shown in FIG. 1.

Figure 2A:
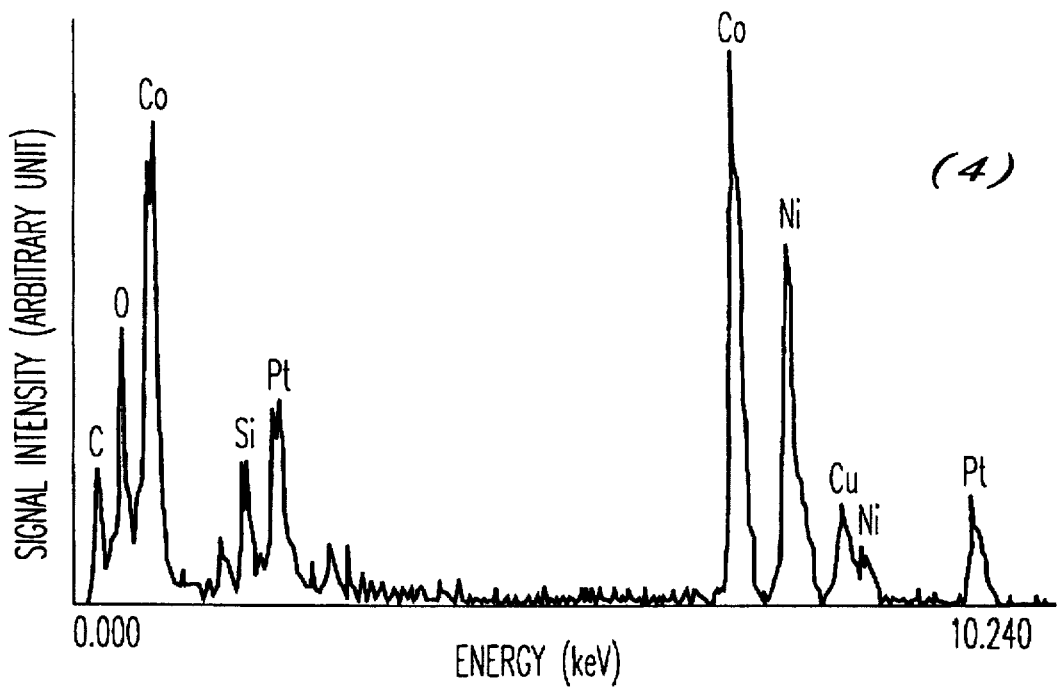
FIG. 2($a$) is a spectrum of a transmission-electron energy-dispersive spectroscopy at the point 4 in FIG. 1.
Figure 2B:
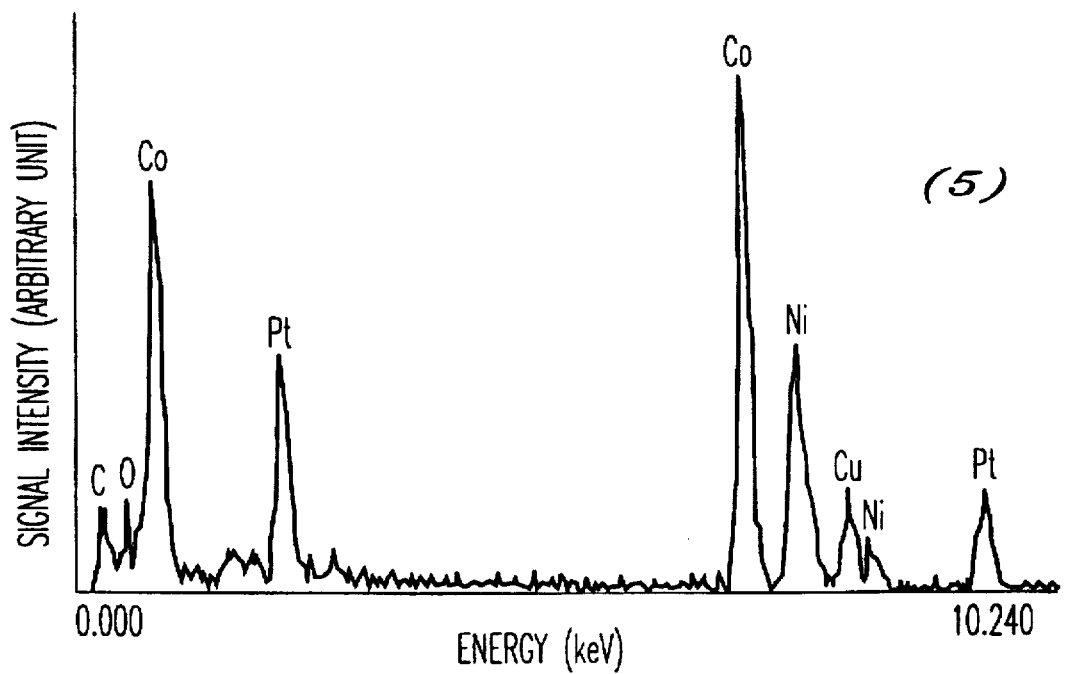

Here, as shown in the figure, the magnetic film is comprised of very fine crystal grains having a grain size at a level of from 50 to 250 Å, and respective grains are separated by a boundary structure having a width at a level of from 10 to 30 Å. The width of such a structure by which the crystal grains are separated, can be controlled by the added amount of $SiO_2$ as indicated in Table 1. Then, to clarify the components of the boundary structure, element analysis was actually conducted by use of an energy-dispersive spectroscopy with a spatial resolution of 10 Å using a transmission electron beam with respect to the portions indicated by numeral numbers in the figure. The results of the measurement are indicated in FIG. 2.

From this figure, the boundary region contains Si and O, and with reference to the above-mentioned results of XPS, it apparently contains $SiO_2$. Whereas, inside the crystal grains, no Si is detected and an O content is found to be small. Here, the amount of O detected in the crystal grains is a slight amount which can be considered to be formed by oxidation of a part of the magnetic film during the formation of the sample for an electron microscope.

Figure 3:
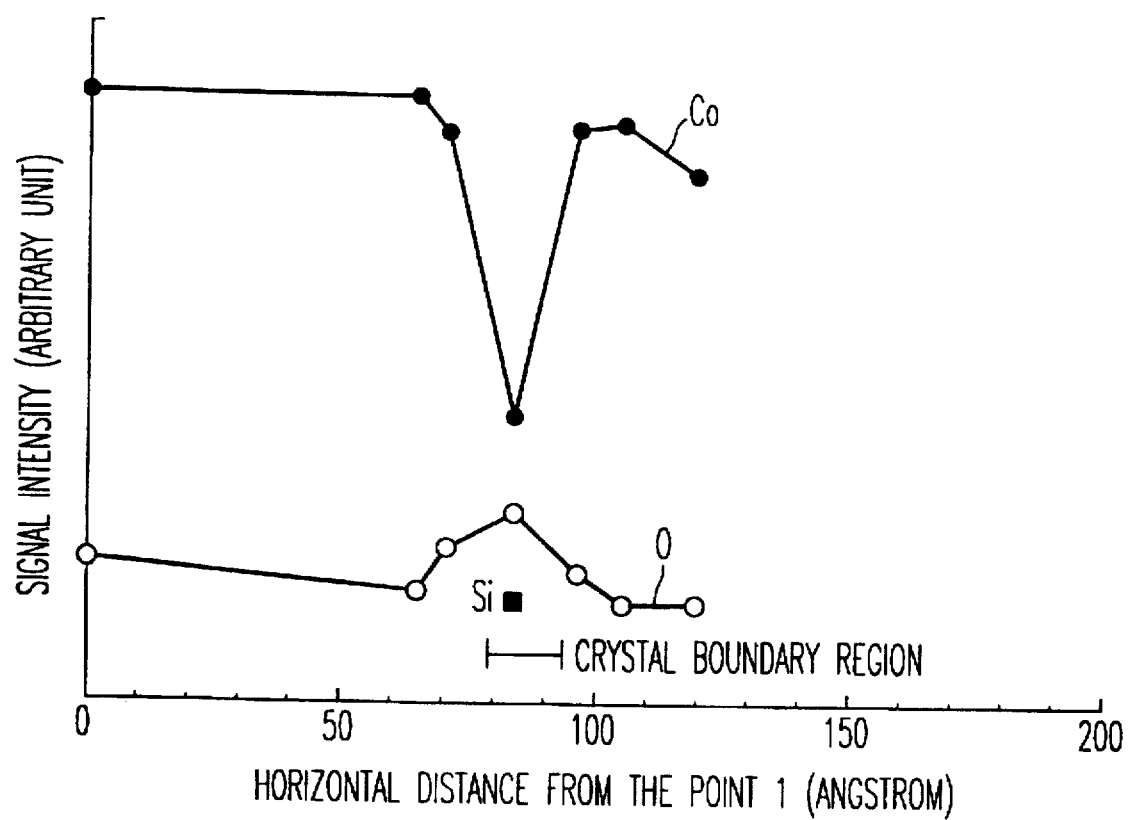
FIG. 3 is a graph representing signal intensities of respective elements of Co, Si and O at each analysis point in FIG. 1 at the distance from the point 1. The horizontal solid line in the figure represents a grain-boundary region.

Then, on the basis of the results of element analysis of the respective analyzed points, respective signal intensities of Si, O and Co detected are plotted assuming the analyzed point 1 as a standard, and the results are shown in FIG. 3. In this figure, an actual boundary region is indicated.

It is apparent from this figure that the incorporated $SiO_2$ is present in the boundary region in the phase-segregated form. Accordingly, it was ascertained that respective Co alloy crystal grains having a sufficiently small grain size are separated by the non-ferromagnetic and non-metallic component as mentioned above, and as a result, a strong magnetic exchange interaction between the crystal grains is weakened, thereby resulting in a remarkably high coercivity and a sufficiently reduced media noise of the CoNiPt magnetic film having $SiO_2$ incorporated.

EXAMPLE 2

In the same manner as in Example 1, a magnetic recording medium having NiP/CoNiCrPtSiO/carbon films sequentially laminated on the aluminum disk substrate having a NiP plating layer formed on the surface in a thickness of 15 μm, followed by texturing treatment, was formed by sputtering. For the formation of the magnetic film, a composite target having 19 surface area % of $SiO_2$ chips having a size of 5 mm×5 mm and a thickness of 1 mm, uniformly placed on a Co(77)Ni(7)Cr(4)Pt(12) alloy hot-press target, was used, and a RF plasma was used. The composition of the actually formed magnetic film was analyzed by an Auger electron spectroscopy, to find $Co_{71}Ni_6Cr_4Pt_{11}(SiO_2)_8$. In the above composition, the content of an unavoidably contained residual oxygen was eliminated. The thickness of the NiP underlayer film was 210 Å, and the thickness of the magnetic film was 500 Å. During the formation of the film, an Ar gas containing 0.1 vol % nitrogen gas was used and the sputtering pressure was 20 mTorr. Further, during the formation of the film, no intentional heating of the substrate or no application of a bias voltage to the substrate was conducted.

The magnetic properties of thus obtained magnetic recording media, measured by a vibrating sample magnetometer, are shown in Table 2 with those of the case where a Co(77)Ni(7)Cr(4)Pt(12) alloy target to which no $SiO_2$ was incorporated, was used as comparative data. In the table, the separation width between crystal grains obtained from the crystal grain structure observed by a transmission-electron microscope is also indicated. As a sample for the observation, the magnetic recording medium was laminated by mechanical polishing and ion-thinning method for use as in Example 1.

As apparent from the results, no substantial separation between the crystal grains was formed when no $SiO_2$ was added (the separation width was 0), a segregated structure was formed between the crystal grains by an addition of $SiO_2$, and at the same time the coercivity of the magnetic film remarkably increased. Although the coercive squareness slightly decreased, it was not problematic in a practical used. Further, the media noise which is very important factor to realize the high density magnetic recording, was remarkably reduced by the addition of $SiO_2$. As a result, the S/N ratio which is a ratio of signal intensity to media noise, was remarkably improved.

Figure 4:
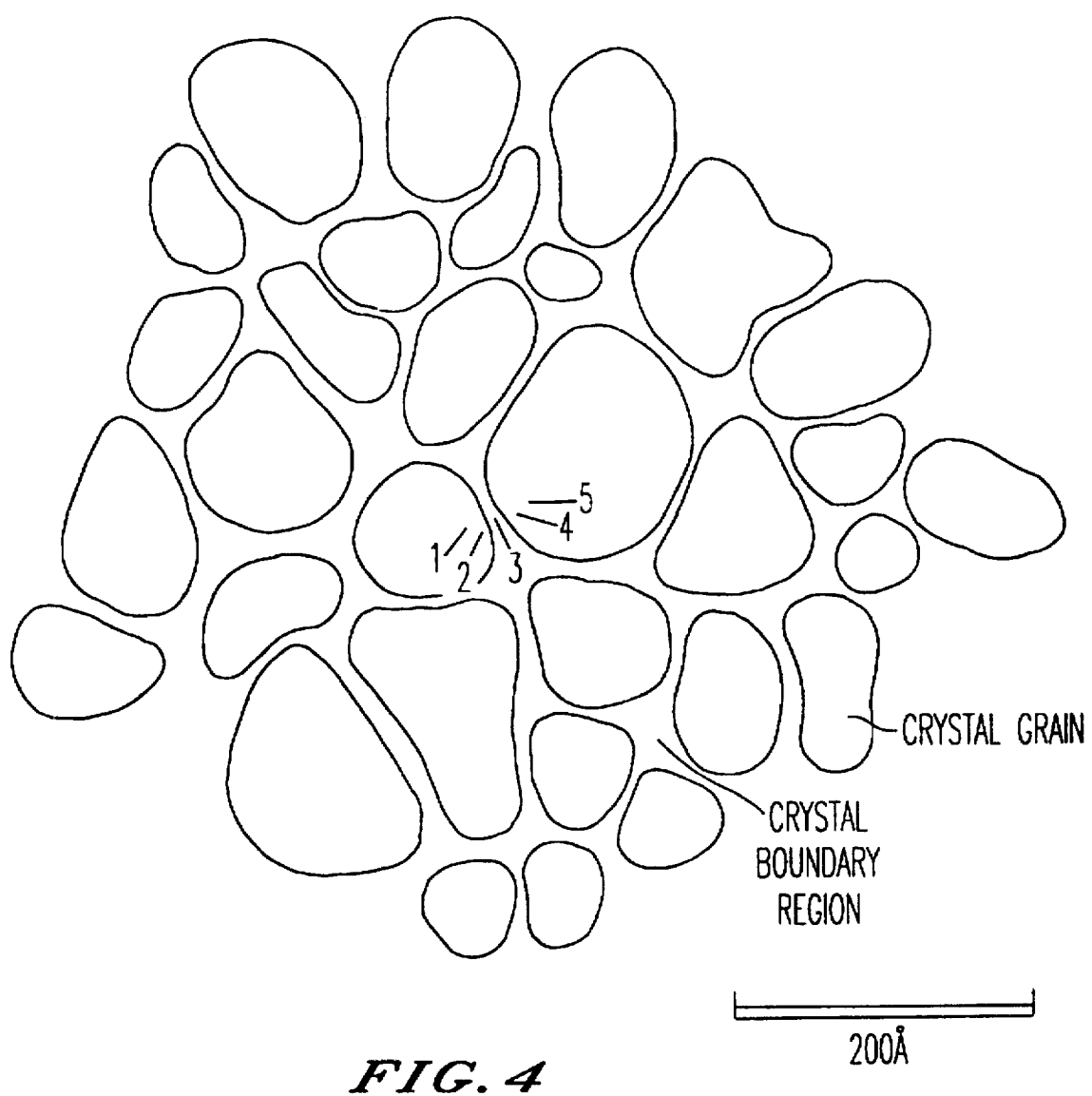
FIG. 4 is a diagrammatic view of a crystal grain structure of a CoNiCrPt magnetic film having $SiO_2$ incorporated, observed by a transmission-electron microscope. The numerals in the figure are analysis points.

Then, the crystal grain structure was actually analyzed by use of an energy-dispersive spectroscopy with a spatial resolution of 10 Å using a high-resolution transmission-electron beam. Firstly, the crystal grain structure of the CoNiCrPt magnetic film having $SiO_2$ incorporated observed by a transmission-electron microscope is diagrammatically shown in FIG. 4.

Figure 5A:
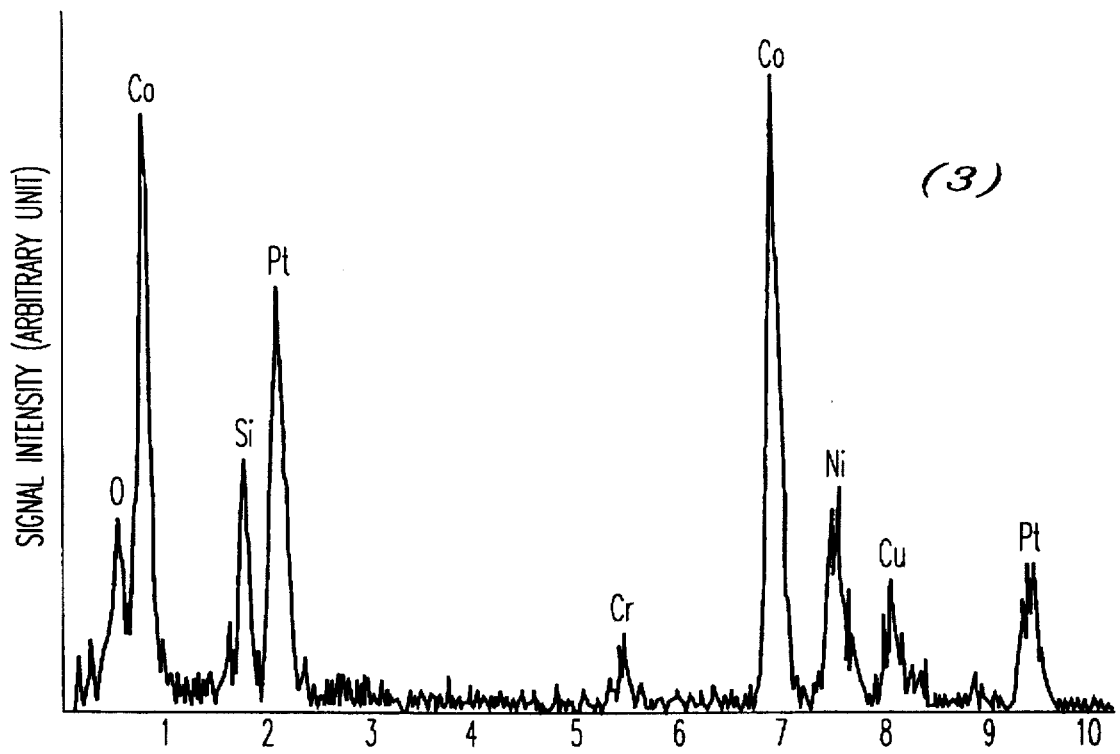
FIG. 5($a$) is a spectrum of a transmission-electron energy-dispersive spectroscopy at the point 3 in FIG. 4.
Figure 5B:
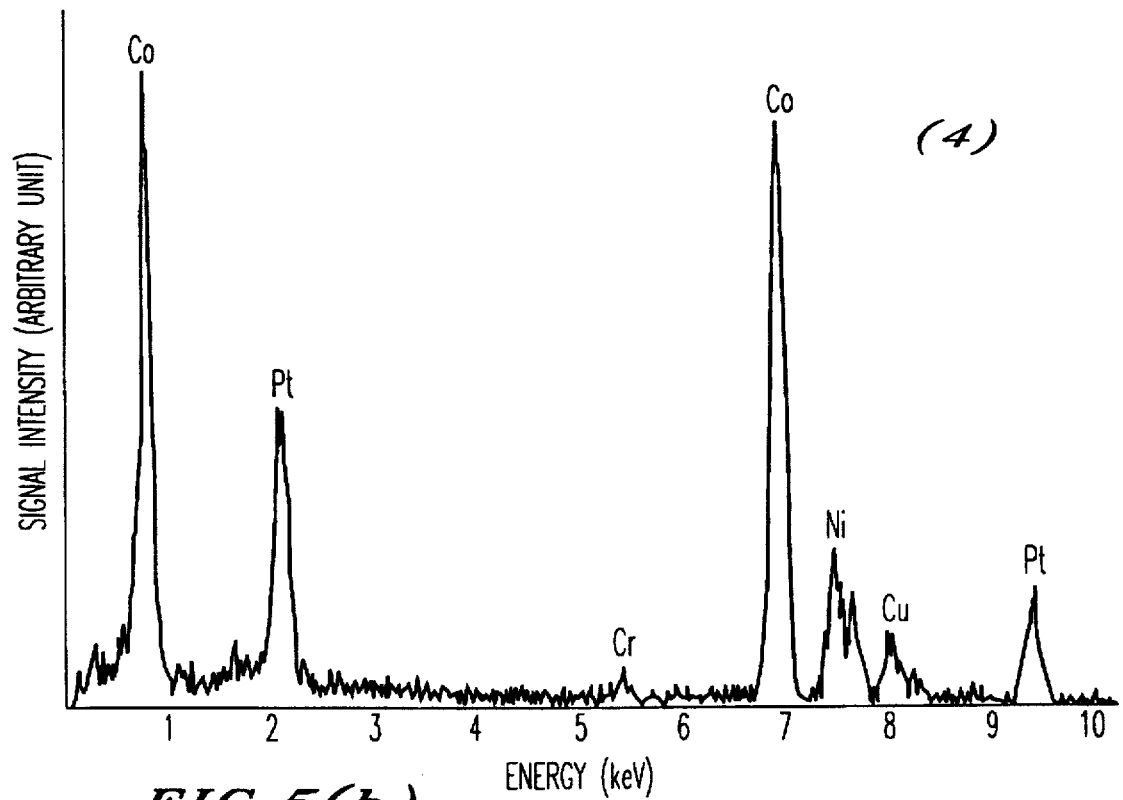

The magnetic film is comprised of very fine crystal grains having a grain size at a level of from 50 to 200 Å, and respective grains are separated by a boundary structure having a width at a level of from 10 to 40 Å. Then, to clarify the components of the boundary structure, element analysis was actually conducted by use of an energy-dispersive spectroscopy with a spatial resolution of 10 Å using a transmission-electron beam with respect to the portions indicated by numeral numbers in the figure. The results of the measurement are indicated in FIG. 5.

From this figure, the boundary region 3 contains Si and a large amount of O. Whereas, inside the crystal grains 4, Si and O are hardly found.

Figure 6:
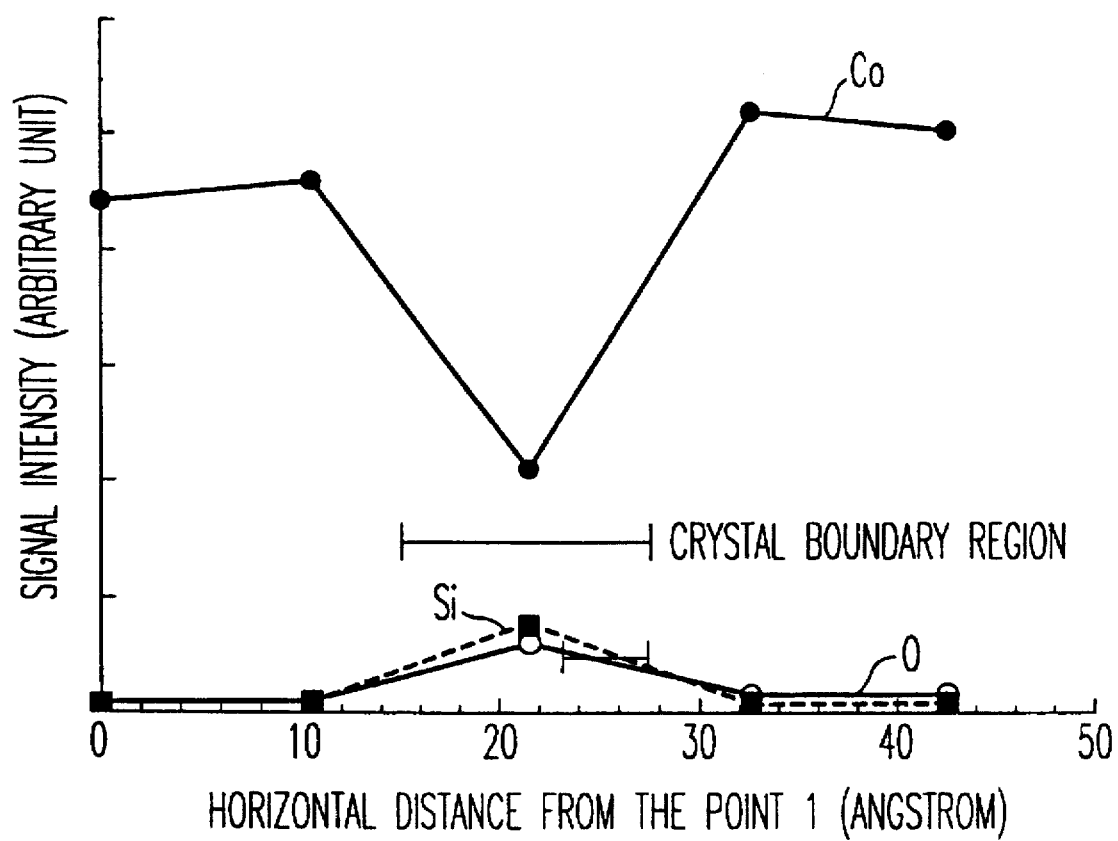
FIG. 6 is a graph representing signal intensities of respective elements of Co, Si and O at each analysis point in FIG. 4 at the distance from the point 1. The horizontal solid line in the figure represents a grain-boundary region.

Then, on the basis of the results of element analysis of the respective analyzed points, respective signal intensities of Si, O and Co detected were plotted assuming the analyzed point 1 as a standard, and the results are shown in FIG. 6. In this figure, an actual boundary region is indicated.

It is apparent from this figure that the incorporated $SiO_2$ is present in the boundary region in the phase-segregated form, apart from the crystal grains constituting the magnetic thin film. Namely, it was confirmed that in the CoNiCrPtSiO magnetic film, as in the CoNiPtSiO magnetic film in Example 1, $SiO_2$ as the non-ferromagnetic and non-metallic component segregated in the boundary region between the crystal grains, whereby respective Co alloy crystal grains having a small grain size were separated by such a boundary structure. As a result, it was confirmed that a remarkably high coercivity and a remarkably reduced media noise were obtained.

As mentioned in the above Examples, when $SiO_2$ is selected as the oxide to be added, when the amount of $SiO_2$ to be added is less than 2 atomic %, the coercivity which is important to realize the future high density magnetic recording will not reach a level of from 1,600 to 1,800 Oe or a higher level, and a S/N ratio which is a ratio of signal intensity to media noise, is significantly low as compared with the case where at least 2 atomic % of $SiO_2$ is contained, such being inadequate to obtain the effects of the present invention. Further, if the added amount of $SiO_2$ exceeds 20 atomic %, the remanence thickness product (Mrt) tends to reduce to a level of about 50% of that where no $SiO_2$ is added, whereby the signal intensity will be remarkably reduced, such being inadequate. Further, at the same time, the squareness decreases to less than 0.7, whereby the signal intensity and the high-frequency property will be substantially reduced, such being inadequate.

The crystal grain structure in the magnetic film is defined in the present invention, which brings about such useful magnetic properties and magnetic recording properties, and a method for preparing it, have been, of course, ascertained in the other CoPt-based magnetic film using a NiP underlayer. It should be mentioned that the present invention is not limited only to the CoPt-based magnetic film using the NiP underlayer, and is apparently applicable to the cases where other magnetic alloy film for high density magnetic recording media or other underlayers are used, by optimizing the sputter process.

TABLE 1

| Magnetic alloy | Magnetic film thickness (Å) | Crystal grain size (Å) | Separation width between crystal grains (Å) | Coercivity (Oe) | Remanence thickness product ($10^{-3}$ emu/cm$^2$) | Coercive squareness (S*) | Signal intensity (mV) | Media noise (mV$^2$) | S/N (dB) |
|---|---|---|---|---|---|---|---|---|---|
| $Co_{81}Ni_7Pt_{12}$ | 458 | 180–270 | 0 | 1680 | 3.24 | 0.903 | 0.330 | 21.53 | 23.28 |
| $Co_{80}Ni_7Pt_{11}(SiO_2)_2$ | 500 | 150–200 | 5–10 | 2009 | 3.36 | 0.894 | 0.350 | 15.67 | 27.26 |
| $Co_{79}Ni_6Pt_{11}(SiO_2)_4$ | 550 | 105–150 | 10–30 | 2414 | 3.22 | 0.869 | 0.322 | 12.31 | 29.37 |

TABLE 2

| Magnetic alloy | Magnetic film thickness (Å) | Crystal grain size (Å) | Separation width between crystal grains (Å) | Coercivity (Oe) | Remanence thickness product ($10^{-3}$ emu/cm$^2$) | Coercive squareness (S*) | Signal intensity (mV) | Media noise (mV$^2$) | S/N (dB) |
|---|---|---|---|---|---|---|---|---|---|
| $Co_{77}Ni_7Cr_4Pt_{12}$ | 500 | 230–300 | 0 | 1068 | 3.25 | 0.917 | 0.738 | 17.56 | 21.44 |
| $Co_{71}Ni_6Cr_4Pt_{11}(SiO_2)_8$ | 500 | 40–160 | 10–40 | 2001 | 2.09 | 0.866 | 0.442 | 1.42 | 35.50 |

According to the present invention, it is possible to obtain a high coercivity of at least 2,000 Oe required for future high density magnetic recording and a sufficiently reduced media noise property to meet particularly the so-called MR head using the magneto-resistance effect. Further, according to the present invention, it is possible to obtain the above-mentioned high coercivity and remarkably reduced media noise property by using the magnetic film which has an alloy composition having less reduction of the saturation magnetization and squareness which are influential to the high-frequency property of the magnetic recording properties, and the production process of which is highly productive, and the magnetic recording medium using the magnetic film.

Further, in the present invention, it is possible to readily control the segregated structure between the crystal grains which brings about such an excellent magnetic properties by the amount of the oxide added to the target to be used, resulting in a high productivity in the mass production.

In the present invention, the magnetic separation between the crystal grains of the magnetic film is made using the difference in the composition and not using a void, whereby the mechanical strength of the magnetic film will not be reduced. Namely, the present invention has effects that no friction or abrasion between a head and a disk which is problematic in hard magnetic disks is caused, or no reduction of mechanical strength against actions called as a so-called CSS at the time of starting or stopping of the head. Further, in such a case, the humidity resistance and chemical resistance are not impaired and it is possible to prepare a magnetic recording medium totally excellent in the reliability.

What is claimed is:

1. A magnetic recording medium comprising a magnetic thin film on a substrate, wherein crystal grains constituting the magnetic thin film each individually are separated by a grain-boundary region not having a void containing a non-ferromagnetic and non-metallic material, wherein the non-ferromagnetic and non-metallic material is an oxide and is at least one selected from the group consisting of $SiO_2$, $Al_2O_3$, $TiO_2$, $ZrO_2$ and $Y_2O_3$, wherein the grain size of the crystal grains is from 10 to 500 Å and the separation width between the crystal grains is substantially from 5 to 50 Å.

2. The magnetic recording medium according to claim 1, wherein the separation width between the crystal grains is from 10 to 50 Å.

3. The magnetic recording medium according to claim 1, wherein the magnetic thin film is of the formula $Co_{100-a-b-c-d}Ni_aCr_bPt_cM_d$ wherein M is a non-ferromagnetic and non-metallic element or compound, a, b, c and d are atomic % of Ni, Cr, Pt and M, respectively, satisfying $0 \leq a \leq 15$, $0 \leq b \leq 15$, $0 < c \leq 20$, and $0 < d \leq 20$, and a and b are not 0 at the same time.

4. The magnetic recording medium according to claim 1, wherein said oxide is $SiO_2$.

* * * * *